United States Patent
Corman et al.

(10) Patent No.: US 6,910,853 B2
(45) Date of Patent: Jun. 28, 2005

(54) STRUCTURES FOR ATTACHING OR SEALING A SPACE BETWEEN COMPONENTS HAVING DIFFERENT COEFFICIENTS OR RATES OF THERMAL EXPANSION

(75) Inventors: Gregory Scot Corman, Ballston Lake, NY (US); Anthony John Dean, Scotia, NY (US); Leonardo Tognarelli, Firenze (IT); Mario Pecchioli, Prato (IT)

(73) Assignee: General Electric Company, Niskayuna, NY (US)

( * ) Notice: Subject to any disclaimer, the term of this patent is extended or adjusted under 35 U.S.C. 154(b) by 35 days.

(21) Appl. No.: 10/065,876

(22) Filed: Nov. 27, 2002

(65) Prior Publication Data

US 2005/0058537 A1 Mar. 17, 2005

(51) Int. Cl.[7] ............................................... F01D 25/26
(52) U.S. Cl. ....................... 415/136; 415/174.2; 60/800
(58) Field of Search ................................. 415/134, 135, 415/136, 170.1, 173.3, 174.2, 214; 60/796, 799, 800, 752

(56) References Cited

U.S. PATENT DOCUMENTS

| | | | |
|---|---|---|---|
| 4,302,941 A | 12/1981 | DuBell | 60/757 |
| 4,307,993 A | * 12/1981 | Hartel | 415/116 |
| 4,411,594 A | 10/1983 | Pellow et al. | 415/173.3 |
| 4,613,280 A | * 9/1986 | Tate | 415/17 |
| 4,785,623 A | 11/1988 | Reynolds | 60/796 |
| 5,137,421 A | 8/1992 | Hayton | 415/173.3 |
| 5,289,677 A | 3/1994 | Jarrell | 60/796 |
| 5,291,732 A | 3/1994 | Halila | 60/796 |

* cited by examiner

Primary Examiner—F. Daniel Lopez
Assistant Examiner—Dwayne J. White
(74) Attorney, Agent, or Firm—Fletcher Yoder

(57) ABSTRACT

A structure for attaching together or sealing a space between a first component and a second component that have different rates or amounts of dimensional change upon being exposed to temperatures other than ambient temperature. The structure comprises a first attachment structure associated with the first component that slidably engages a second attachment structure associated with the second component, thereby allowing for an independent floating movement of the second component relative to the first component. The structure can comprise split rings, laminar rings, or multiple split rings.

18 Claims, 4 Drawing Sheets

STRUCTURES FOR ATTACHING OR SEALING A SPACE BETWEEN COMPONENTS HAVING DIFFERENT COEFFICIENTS OR RATES OF THERMAL EXPANSION

FEDERAL RESEARCH STATEMENT

This invention was first conceived or reduced to practice in the performance of work under contract DE-FC02-92CE41000 with the United States Department of Energy. The United States of America may have certain rights to this invention.

BACKGROUND OF INVENTION

The present invention relates to structures for attaching together or sealing a space between components having different coefficients, rates, or amounts of thermal expansion. In particular, the present invention relates to structures for attaching high-temperature shielding components of gas turbine engines to adjacent components thereof or for sealing a space between such components.

It has long been a problem to support components that are subject to thermal expansion and contraction with support members that are also subject to such thermal expansion and contraction but at a different rate. If the components and support member are rigidly connected, each will be subject to stresses that may eventually lead to their mechanical failure. This problem is particularly acute in the case in which either or both are made from a brittle material such as a ceramic. This problem, for example, can arise in gas turbine engines and, in particular, in the combustion and turbine regions of such engines.

Gas turbine engines, such as those providing thrust power to aircraft or those generating electrical power, conventionally comprise a casing enclosing alternate, stages of rotary and stationary aerofoil blades positioned in an annular gas passage. In order to ensure an efficient operation of such turbine engines, it is important that the clearances between the tips of the rotary aerofoil blades and the radially outer wall of the gas passage are as small as possible. If the clearances are too great, excessive gas leakage occurs across the blade tips, thereby reducing turbine efficiency. There is a danger, however, that if clearances are reduced so as to reduce leakage, it is likely that under certain turbine operating conditions, the tips of the rotary blades will make contact with the gas passage wall, thereby causing both blade and wall damage.

In an attempt to ensure that optimum blade tip clearances are achieved and maintained with minimal gas leakage across them, it has been conventional to surround a stage of rotary aerofoil blades with a shroud ring. The shroud ring is conventionally attached to the turbine casing in such a manner that it provides a radially inner surface that defines a portion of the radially outer wall of the turbine annular gas passage. Although shroud rings are quite easily made with high tolerances, challenges still exist in ensuring that optimum tip clearances are maintained during turbine operation. These challenges are associated mainly with the different rates of the thermal expansion of the turbine casing, the shroud ring, and the aerofoil blade assembly. Thus, for example, even if the turbine casing and the: shroud ring have similar thermal expansion coefficients, the differences in their masses and in the temperatures to which they are exposed during turbine operation still result in different rates or amounts of expansion or contraction. Consequently, there is a danger of the shroud ring and possibly the turbine casing being distorted.

Similarly, the combustion chamber of a gas turbine engine can be lined with a ceramic combustion chamber liner (or also commonly known as combustor liner) to protect the combustion chamber casing, which is made of a metal, from the very high temperature of the combustion gas. The different coefficients or rates of thermal expansion or contraction of the ceramic and metal also present a danger that either or both would be distorted and mechanical stresses would develop as a result.

Therefore, it is very desirable to provide structures for attaching together or supporting components having different coefficients, rates, or amounts of thermal expansion or contraction so to mitigate or eliminate the danger of shape distortion of these components that could lead to their premature failure. It is also very desirable to provide structures for supporting liners of high-temperature sections of gas turbine engines, which structures help to maintain optimum clearances between the liners and the adjacent elements of the turbine. Furthermore, it is also very desirable to provide structures to seal the space between two components having different coefficients, rates, or amounts of thermal expansion or contraction so to substantially prevent a communication between a medium present in the space and another medium present in the internal space of one component.

SUMMARY OF INVENTION

The present invention provides a structure and a method for attaching together or for sealing a space between a first component and a second component that have different rates or amounts of dimensional change upon being exposed to temperatures other than ambient temperature. The first component and second component have a longitudinal or axial direction and a radial direction. The structure comprises a plurality of support members fixedly disposed between the first and the second component for slidably attaching the first component to the second component such that the second component is capable of floating in an independent movement relative to the first component in at least one of radial and axial direction. The first component and second component have different radial dimensions and are spaced apart from one another such that their longitudinal axes substantially coincide at room temperature. The longitudinal axes are said to substantially coincide when a variation in a clearance between the first and the second component measured at any point around a circumference of the second component is less than a desired tolerance value. Each of the support members defines a cavity and comprises at least a first attachment structure that slidably engages a mating second attachment structure provided on the second component. The support members may be directly or indirectly and fixedly attached to or formed into a circumferential surface of the first component.

In one aspect of the present invention, the plurality of support members is fixedly attached to the first component. The first attachment structure comprises at least a first ring that is radially expandable and is disposed in a support member between a surface of the support member and a circumferential surface of the second component. The mating second attachment structure comprises at least two second rings being slidably disposed on the circumferential surface of the second component and having generally different diameter than that of the first ring such that there is always an overlap between at least a portion of a surface of a second ring and at least a portion of a surface of an adjacent first ring. The second rings are spaced apart from one another to slidably engage a first ring therebetween.

In another aspect of the present invention, a structure of the present invention for attaching a first component to a second component comprises a plurality of cavities formed into a circumferential surface of a first component and a plurality of protuberances selected form the group consisting of pins and bosses extending radially from a circumferential surface of the first component in the direction of the cavities. Each cavity is disposed opposite a corresponding pin or boss to slidably engage the pin or boss therein.

In still another aspect of the present invention, a method for attaching together and for sealing a space between a first component and a second component that have different rates of dimensional change upon being exposed to temperatures other than ambient temperature. The method comprises: (1) providing a first component and a second component that have a longitudinal or axial direction and a radial direction, generally have different radial dimensions, and are spaced apart from one another such that their longitudinal axes substantially coincide at room temperature; (2) providing a plurality of support members disposed between the first and the second component for slidably attaching the first component to the second component such that the second component is capable of floating in an independent movement relative to the first component in at least one of radial and axial direction, each support member defining a cavity and comprising a first attachment structure; (3) providing a mating second attachment structure on the second component; and (4) slidably engaging the first attachment structure with the mating second attachment structure to attach the first component to the second component. The structure also prevents a medium present in a space between the first and second components from entering a space defined by the second component.

Other features and advantages of the present invention will be apparent from a perusal of the following detailed description of the invention and the accompanying drawings in which the same numerals refer to like elements.

DETAILED DESCRIPTION

The present invention provides a structure and a method for attaching together or for sealing a space between a first component and a second component that have different coefficients of thermal expansion or different rates or amounts of dimensional change upon being exposed to temperatures other than ambient temperature. The present invention finds uses in the protection of metal casing of thermal equipment, such as gas turbine engines, from very high temperatures of combustion products or in the mitigation of the effects of different coefficients or rates of thermal expansion or contraction of adjacent parts of the thermal equipment. For example, a support or sealing structure of the present invention is used to attach a combustor liner to the wall of the combustion chamber of a gas turbine engine so that their different rates of thermal expansion do not impose a stress on and yield a premature mechanical failure of either part. In another application, a support or sealing structure of the present invention is used to attach a shroud ring of a turbine section to the casing in a gas turbine engine to maintain a near optimum clearance, between the shroud ring and the aerofoil blades of the turbine. A support or sealing structure of the present invention also prevents a medium present in a space between the first component and the second component from entering a space defined by the second component or vice versa.

Figure 1:
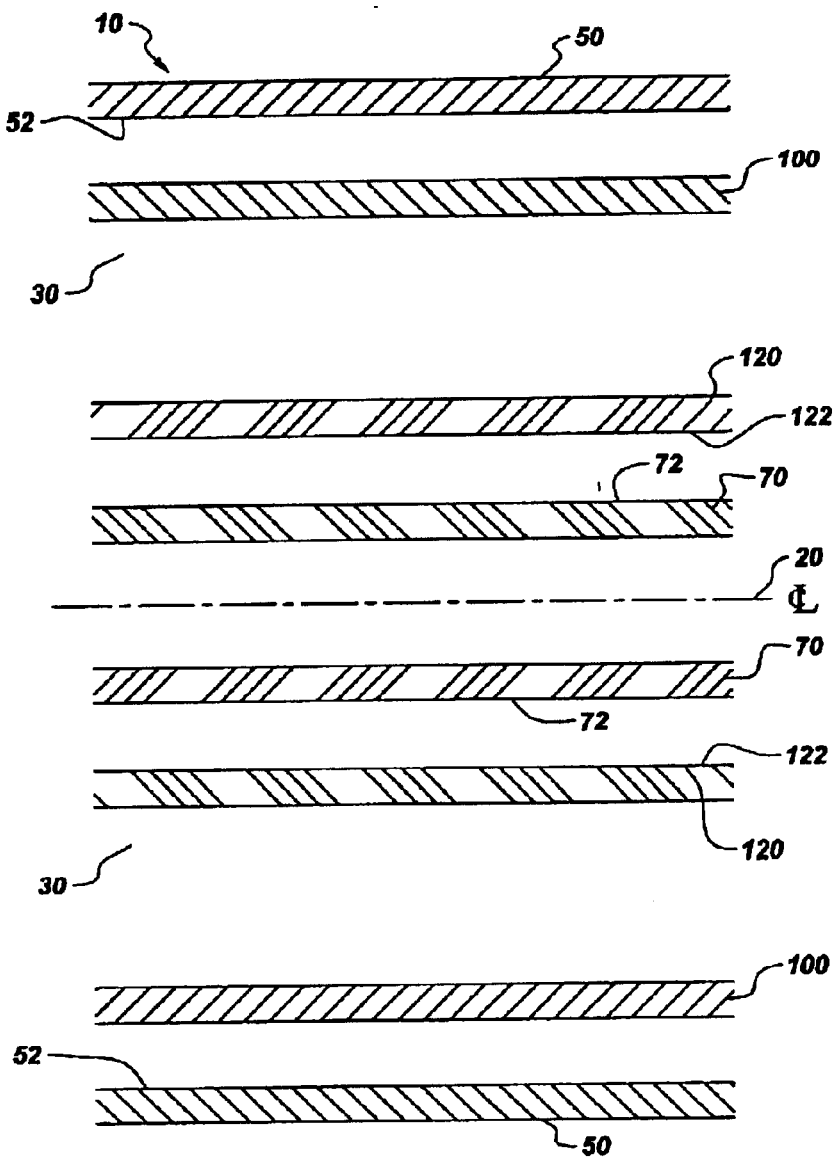
FIG. 1 is a schematic diagram of a section of a first embodiment of a combustor of a turbine engine.

FIG. 1 is a schematic diagram of a section 10 of a turbine engine showing a section of a first embodiment combustion chamber or combustor 30 in which fuel is mixed with combustion air and ignited to generate a large flow of combustion product gas for powering a turbine (not shown). Combustion chamber or combustor 30 typically has a generally cylindrical shape having a common longitudinal axis 20 with combustor casing 50 and is defined by cylindrical combustor liner 100. Casing 50 is typically made of a metal such as steel or an alloy comprising iron and one or more other metals, such as nickel, cobalt, chromium, etc. It may be desirable to choose a material that can withstand temperature as high as about 900–1100° C. In one embodiment, combustor liner 100 is made of a ceramic material, such as a fiber-reinforced ceramic matrix composite. A suitable material is SIC-fiber reinforced SiC-matrix composite. Fiber-reinforced ceramic composites are disclosed in, for example, U.S. Pat. Nos. 4,889,686; 4,944,904; 5,154,787; and 5,177,039; the contents of which are incorporated herein by reference. In another embodiment, combustor liner 100 may be made of a metal alloy that can withstand very high combustion temperatures. Ceramic combustor liner 100 is disposed in combustion section 100 such that it can move independently relative to casing 50 to accommodate the different coefficients of thermal expansion of the materials of combustor liner 100 and of casing 50. Typically, an amount of cooling air is conducted through the space between combustor liner 100 and casing 50 to ensure that the temperature of casing 50 does not rise excessively. It is desirable that this cooling air does not leak into combustion chamber 30 and decrease the temperature of the combustion product. An attachment of the present invention can also advantageously provide a sealing mechanism to prevent such leakage.

In a further embodiment, combustor chamber 30 may have an annular shape having common longitudinal axis 20 with turbine engine casing 50. The term "annular shape" includes structures that have constant or varying diameter along its longitudinal axis. Turbine engine combustion chamber section 10 has an outer metal casing 50 and an inner metal casing 70 that are made of a metal or an alloy as disclosed above. The inner surface 52 of outer metal casing 50 and the outer surface 72 of inner metal casing 70 may be desirably coated with a conventional ceramic insulating thermal barrier coating material such as oxides of yttrium and zirconium or oxides of zirconium and scandium. The thermal barrier coating reduces the heat transmission to the metal casing and, thereby, lowers its average temperature. An outer combustor liner 100 is disposed adjacent to inner surface 52 of outer metal casing 50. An inner combustor liner 120 is disposed adjacent to outer surface 72 of inner metal casing 70. Combustor liners 100 and 120 are disposed in combustor section 10 such that they can move independently relative to casings 50 and 70 to accommodate the different coefficients of thermal expansion of the materials of the combustor liners and of the casings. Combustor liners 100 and 120 can comprise ceramic matrix composites, such as a silicon carbide matrix reinforced with silicon carbide fibers, as disclosed above.

Figure 2:
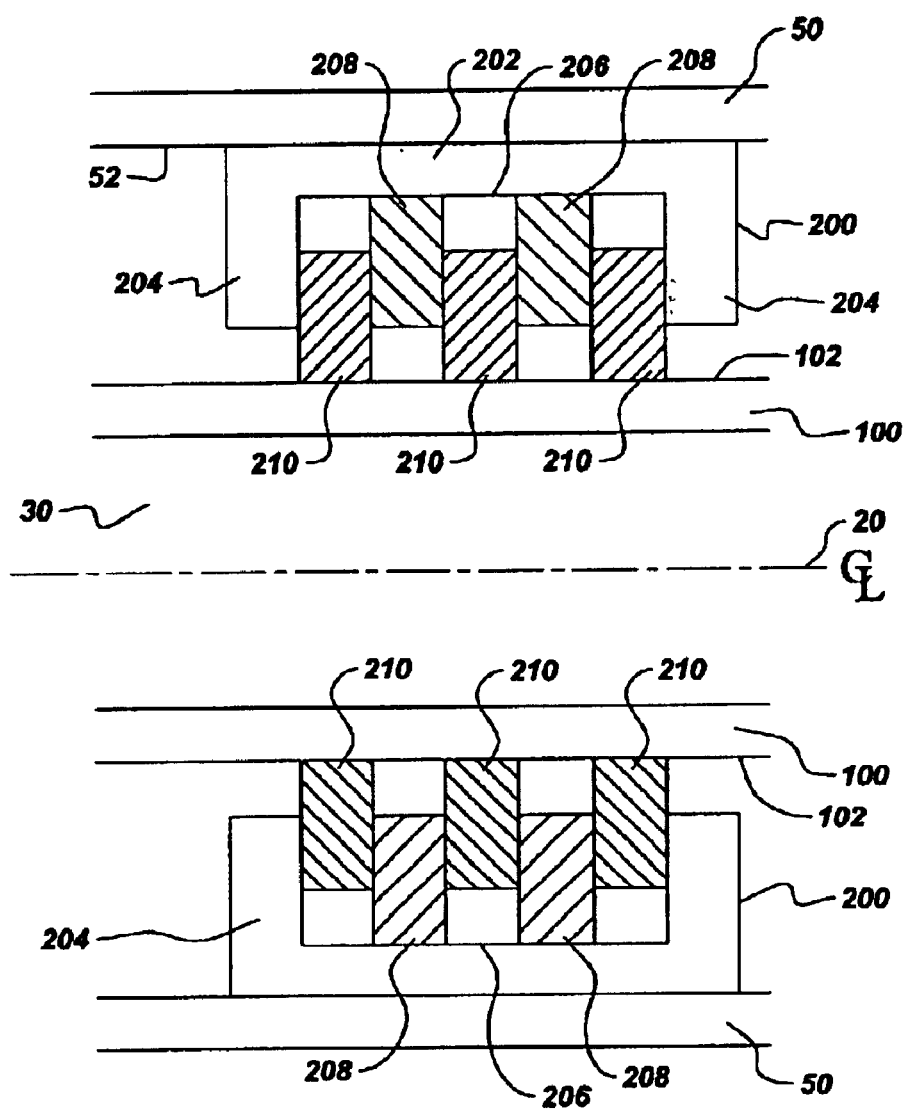
FIG. 2 is a schematic diagram of a section of a second embodiment of a combustor of another turbine engine.
Figure 3:
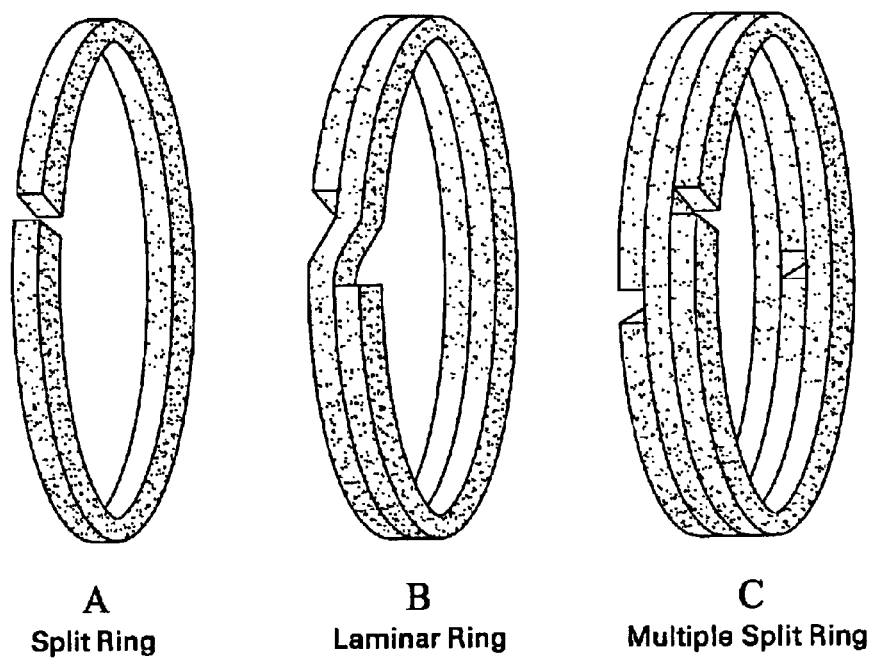
FIG. 3 illustrates a split ring, a laminar ring, and a multiple split ring, that can be used in a support structure of the present invention.

A support or sealing structure of the present invention is also shown in FIG. 1, FIG. 2, which is not drawn to scale. The structure comprises a support member 200 for attaching combustor liner 100 to combustor casing 50 and still allows for an independent radial or axial movement of combustor liner 100 relative to combustor casing 50. In an embodiment wherein the combustor has an annular shape, such as that illustrated in FIG. 1, similar structures (not shown) of the present invention also are employed to attach inner combustor liner 120 to inner combustor casing 70. In one embodiment of the present invention, support member 200 generally has a cylindrical annular shape, the outer circumferential surface of which is fixedly attached to inner surface 52 of outer casing 50. Support member 200 has a circumferential portion 202 and two opposed radially inward extending portions 204. Circumferential portion 202 and radially inward extending portions 204 together define a cavity 206. Two mating attachment structures comprising laminar or split rings 208 and 210 are disposed within cavity 206. The first attachment structure comprises a plurality of first laminar or split rings 208. Rings 208 are disposed adjacent to an inner circumferential surface of cavity 206 and are spaced apart from one another and from outer surface 102 of outer combustor liner 100. A plurality of second laminar or split rings 210 having an average diameter generally smaller than that of first rings 208 and being disposed adjacent to outer surface 102 of combustor liner 100. Second rings 210 are spaced apart from one another such that each of second rings 210 slidably engages between and overlaps two adjacent first rings 208. The outer circumferential surface of second rings 210 is spaced apart from the inner surface of circumferential portion 202 of cavity 206. Laminar or split rings 208 and 210 are capable of expanding or contracting in the radial direction so as to accommodate the different coefficients or rates of thermal expansion or contraction of combustor liner 100 and casing 50. Each of first and second rings 208 and 210 may have a configuration of a single split ring, a double laminar ring, or a plurality of split rings having the same diameter and attached together, illustrated and referred to as A, B and C respectively in FIG. 3. Laminar or split rings 208 and 210 can be made of a ceramic material such as a ceramic matrix composite material as disclosed above. However, suitable metals with or without a thermal barrier coating also may be used for rings 208 and 210. As combustor liner 100 is exposed to a very high temperature of the combustion product gas, it tends to expand in the radial direction. Second rings 210 expand with combustor liner 100 because of the existence of a split in or the discontinuous nature of the rings. Each of second rings 210 thus slides over at least an adjacent first ring 208 to accommodate the expansion of combustor liner 100 so as not to allow a stress build-up therein.

Support rings 208 and 210 also act as a seal between support member 200 and combustor liner 100 so as to prevent undesired leakage of cooling air from the space between casing 50 and combustor liner 100 into combustion chamber 30. Such a prevention of leakage helps to maintain a high efficiency of the engine.

Similarly, in an embodiment wherein combustion chamber 30 has an annular shape, support members and assemblies of laminar or split rings are employed to attach inner combustor liner 120 to inner combustor casing 70. In this case, support members 200 are directly or indirectly and fixedly attached to, for example, outer circumferential surface 72 of inner combustor casing 70. Cavities 206 of support members 200 now face outward toward inner circumferential surface 122 of inner: combustor liner 120. Cavity 206 similarly receives rings 208 and 210 as described above.

Figure 4:
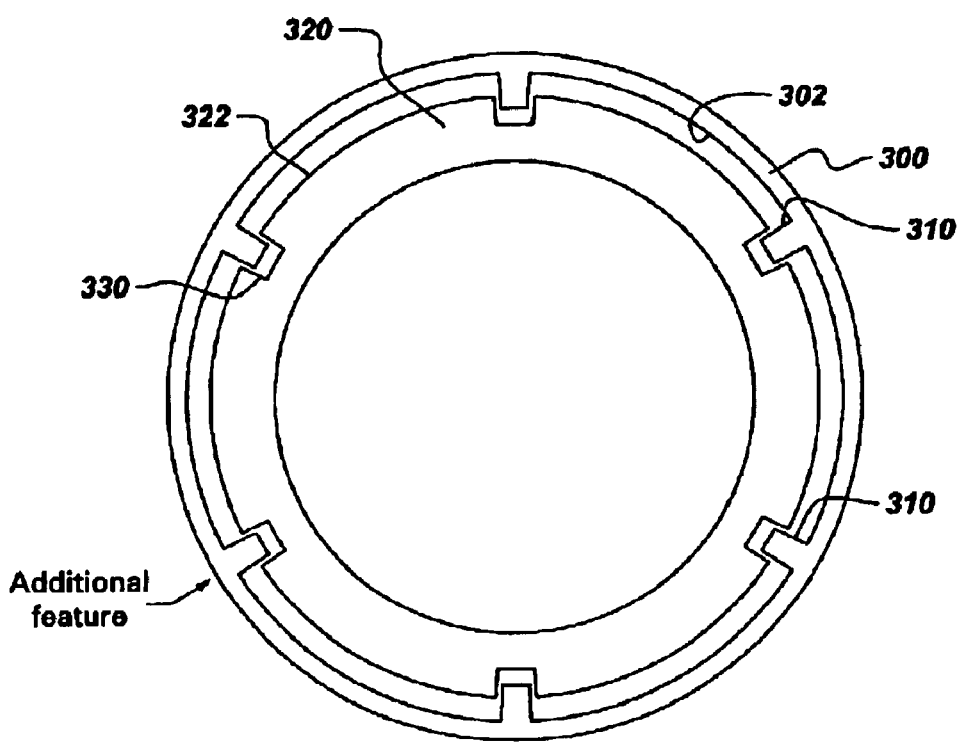
FIG. 4 shows a cross section of a turbine shroud held in place in a turbine casing using a support structure comprising a combination of a pin and an associated cavity.

FIG. 4 shows a structure for attaching a second component 320 to a first component 300 of a turbine engine that would allow for a substantially symmetrical expansion or contraction of the second component with respect to the first component. Such a structure can be disposed along the length of the combustion chamber in addition to assemblies of support rings 208 and 210 disclosed above; substantially to maintain a concentricity of the two components 300 and 320. In one embodiment, the first component may be a combustion chamber casing, and the second component may be a combustor liner. In another embodiment, the first component may be a metallic turbine casing and the second component may be a ceramic shroud ring surrounding turbine blades. First component 300 has a plurality of protuberances such as pins or bosses 310 extending radially inward. Pins or bosses 310 are spaced around a circumference of inner surface 302 of first component 300. An entire inner surface 302 or portions thereof of first component 300 and pins or bosses 310 may be coated with a ceramic insulating thermal barrier coating as disclosed above. Second component 320 is disposed inside and adjacent to inner; surface 302 of first component 300. Second component 320 may be desirably made of a ceramic composite material such as silicon carbide matrix reinforced with silicon carbide fibers, as disclosed above. Second component 320 may also be coated with a material that would inhibit a reaction between a component of the combustion gas product and the shroud ring material. For example, silicon can be effective for this purpose and may be applied to a surface of second component 320 by any conventional method such as physical vapor deposition, melt infiltration, or plasma deposition. A plurality of indentations or cavities 330 is formed into outer surface 322 of second component 320: each indentation or cavity 330 is located opposite to and slidably engages a pin or boss 310. The dimensions of the pins and indentations may be controlled to a high degree of tolerance such that their combination allows for a substantial symmetrical expansion of second component 320 with respect to first component 300. The clearance between a pin or boss 310 and a corresponding indentation 330 also allows for an axial movement of second component 320 relative to first component 300 to accommodate any difference in the thermal expansion of the two components. It is understood that the present invention is equally effective if pins or bosses 310 are formed on second component 320 and indentations or cavities 330 are formed on first component 300.

Laminar ring attachments such as those described above and illustrated in FIG. 3 were implemented and tested in a combustor and a gas turbine engine. In the first example, a combustor liner was made of SiC fiber-reinforced SiC ceramic matrix composite. Two laminar ring seals having a $ZrO_2$-based thermal barrier coating on the inner surface of each ring adjacent to the outer surface of the combustor liner were used as compliant attachments between the combustor liner and the combustor casing, and as seals to prevent compressor air from leaking into the combustor. In another test, a layer of alumina ceramic cloth (Nextel 440) was disposed between the inner surface of the rings and the outer surface of the combustor liner to prevent any possible chemical interaction between the combustor liner and the laminar rings. High-temperature testing was successfully carried out with these laminar ring seals for more than 150 hours.

In a second example, a turbine engine shroud ring was provided with a laminar ring seal/attachment and a plurality of slots disposed at one end of the shroud ring. Each of the slots slidably accepted a radial boss attached to a fixed metal support structure. The combination of the laminar ring seal/attachment and radial bosses' successfully maintained the radial position of the shroud ring with respect to the outer turbine engine casing on a General Electric PGT-2 engine for more than 1000 hours.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A structure for attaching together or sealing a space between a first component and a second component that have different rates or amounts of dimensional change upon being exposed to temperatures other than ambient temperature, said structure comprising a plurality of support members fixedly disposed between said first component and said second component, each of said support member defining a cavity and accepting therein at least a first attachment structure that slidably engages a mating second attachment structure provided on said second component such that said second component is capable of floating in an independent movement relative to said first component in at least one of radial and axial direction, said structure further substantially preventing a communication between a medium present in a space between said first component and said second component from and another medium present in a space defined by said second component.

2. The structure according to claim 1, wherein said first attachment structure comprises at least a first ring selected from the group consisting of split rings, laminar rings, and multiple split rings attached together; said at least a first ring is disposed in said cavity of said support member around said second component; said mating second attachment structure comprises at least two second rings selected from the group consisting of split rings, laminar rings, and multiple split rings attached together; said second rings are spaced apart to slidably engage said first ring therebetween; and at least a portion of a surface of said second rings always overlaps at least a portion of a surface of said at least first ring.

3. The structure according to claim 2, wherein said second rings are slidable over said second component.

4. The structure according to claim 2, wherein said first component and said second component are components of a gas turbine engine.

5. The structure according to claim 4, wherein said first component is selected from the group consisting of combustor casing and turbine casing, and said second component is a combustor liner when said first component is a combustor casing, and a turbine shroud ring when said first component is a turbine casing.

6. The structure according to claim 5, wherein said first component comprises a material selected from the group consisting of steel and iron alloy; and said second component comprises a ceramic composite material.

7. The structure according to claim 6, wherein a surface of said first component is coated with a thermal barrier coating, and a surface of said second component is coated with a material selected from the group consisting of thermal barrier coating materials and materials that inhibit a reaction between said ceramic composite material and a combustion product gas in said turbine engine.

8. A structure for attaching together or sealing a space between a first component and a second component that have different rates or amounts of dimensional change upon being exposed to temperatures other than ambient temperature, said structure comprising:

(a) a plurality of support members fixedly disposed between said first component and said second component, each of said support member defining a cavity and comprising at least a first ring and at least two mating second rings, said at least first ring and said at least two second rings being selected from the group consisting of split rings, laminar rings, and multiple split rings attached together, said first rings being disposed in said cavity of said support member around said second component, said at least two second rings being spaced apart slidably to engage said at least first ring therebetween such that at least a portion of a surface of said at least two second rings always overlaps at least a portion of a surface of said at least a first ring; and (b) a plurality of protuberances formed on a surface of said first component and a plurality of corresponding depressions formed into an surface of said second component opposite said surface of said first component, each of said protuberances slidably engaging one of said cavities;

wherein said rings and a combination of said protuberances and said depressions allow for an independent floating movement of said second component relative to said first component in at least one of radial and axial direction, and said structure further substantially prevents a communication between a medium present in a space between said first component and said second component and another medium present in a space defined by said second component.

9. A method for attaching together a first component and a second component that have different rates or amounts of dimensional change upon being exposed to temperatures other than ambient temperature and for substantially preventing a communication between a medium present in a space between said first component and said second component and a medium present in a space defined by said second component, said method comprising: (1) providing said first component and said second component that have a longitudinal or axial direction and a radial direction, generally have different radial dimensions, and are spaced apart from one another such that their longitudinal axes substantially coincide at room temperature; (2) providing a plurality of support members disposed between said first component and said second component for slidably attaching said first component to said second component such that said second component is capable of floating in an independent movement relative to said first component in at least one of radial and axial direction, each support member defining a cavity and accepting a first attachment structure therein; (3) providing a mating second attachment structure on the second component; and (4) slidably engaging said first attachment structure with said mating second attachment structure to attach said first component to said second component.

10. The method according to claim 9, wherein said first attachment structure comprises at least a first ring selected from the group consisting of split rings, laminar rings, and multiple split rings attached together; said first ring is disposed in said cavity of said support member around said second component; said mating second attachment structure comprises at least two second rings selected from the group consisting of split rings, laminar rings, and multiple split rings attached together; said second rings are spaced apart to slidably engage said first ring therebetween; and at least a portion of a surface of said second rings always overlaps at least a portion of a surface of said at least first ring; said method further substantially prevents a medium present in a space between said first component and said second component from entering a space defined by said second component.

11. The method according to claim 10, wherein said second rings are slidable over said second component.

12. The method according to claim 9 further comprising providing at least a first ring and at least two second rings, said rings being selected from the group consisting of split rings, laminar rings, and multiple split rings attached together; said first ring being disposed in said cavity of said support member; said second rings being spaced apart to slidably engage said first ring therebetween; and at least a portion of a surface of said second rings always overlapping at least a portion of a surface of said at least first ring.

13. The method according to claim 10, wherein said first component and said second component are components of a gas turbine engine.

14. The method according to claim 13, wherein said first component is selected from the group consisting of combustor casing and turbine casing, and said second component is a combustor liner when said first component is a combustor casing, and a turbine shroud ring when said first component is a turbine casing.

15. The method according to claim 14, wherein said first component comprises a material selected from the group consisting of nickel- and cobalt-based super alloys; and said second component comprises a ceramic composite material.

16. The method according to claim 15, wherein a surface of said first component is coated with a thermal barrier coating, and a surface of said second component is coated with a material selected from the group consisting of thermal barrier coating materials and materials that inhibit a reaction between said ceramic composite material and a combustion product gas in said turbine engine.

17. A turbine engine comprising a first component, a second component that is disposed within a space defined by said first component, and a structure for attaching together or sealing a space between said first component and said second component that have different rates or amounts of dimensional change upon being exposed to temperatures other than ambient temperature, said structure comprising a plurality of support members fixedly disposed between said first component and said second component, each of said support member defining a cavity and accepting therein at least a first attachment structure that slidably engages a mating second attachment structure provided on said second component such that said second component is capable of floating in an independent movement relative to said first component in at least one of radial and axial direction, said structure further substantially preventing a communication between a medium present in a space between said first component and said second component from and another medium present in a space defined by said second component.

18. A turbine engine comprising a first component, a second component that is disposed within a space defined by said first component, and a structure for attaching together or sealing a space between said first component and said second component that have different rates or amounts of dimensional change upon being exposed to temperatures other than ambient temperature, said structure comprising:

(c) a plurality of support members fixedly disposed between said first component and said second component, each of said support member defining a cavity and comprising at least a first ring and at least two mating second rings, said at least first ring and said at least two second rings being selected from the group consisting of split rings, laminar rings, and multiple split rings attached together, said first rings being disposed in said cavity of said support member around said second component, said at least two second rings being spaced apart slidably to engage said at least first ring therebetween such that at least a portion of a surface of said at least two second rings always overlaps at least a portion of a surface of said at least a first ring; and (d) a plurality of protuberances formed on a surface of said first component and a plurality of corresponding depressions formed into an surface of said second component opposite said surface of said first component, each of said protuberances slidably engaging one of said cavities;

wherein said rings and a combination of said protuberances and said depressions allow for an independent floating movement of said second component relative to said first component in at least one of radial and axial direction, and said structure further substantially prevents a communication between a medium present in a space between said first component and said second component and another space defined by said second component.

* * * * *